United States Patent
Schultze et al.

(10) Patent No.: US 6,736,731 B2
(45) Date of Patent: May 18, 2004

(54) CROSS MEMBER UNIT FOR UNIVERSAL JOINTS HAVING A TRUNNION SEAL

(75) Inventors: Hans-Jürgen Schultze, Bottrop (DE); Erhard Müller, Hattingen (DE); Andreas Neises, Bergisch Gladbach (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 0 days.

(21) Appl. No.: 10/226,021

(22) Filed: Aug. 22, 2002

(65) Prior Publication Data

US 2003/0040368 A1 Feb. 27, 2003

(30) Foreign Application Priority Data

Aug. 23, 2001 (DE) .......................................... 101 40 372
Jun. 2, 2002 (DE) .......................................... 102 04 684

(51) Int. Cl.$^7$ .............................. F16D 3/41; F16J 15/32; F16C 33/80
(52) U.S. Cl. ......................... 464/131; 277/365; 277/402
(58) Field of Search ............................. 464/11, 12, 13, 464/14, 133, 131; 277/365, 402, 562, 565, 628

(56) References Cited

U.S. PATENT DOCUMENTS

| | | | | |
|---|---|---|---|---|
| 3,592,022 A | * | 7/1971 | Stokely ....................... | 464/131 |
| 4,366,996 A | * | 1/1983 | Grandel ....................... | 384/548 |
| 4,834,691 A | * | 5/1989 | Schultze et al. ............ | 464/131 |
| 4,898,081 A | * | 2/1990 | Fecher ......................... | 92/165 R |
| 5,588,915 A | * | 12/1996 | Smith ........................... | 464/14 |
| 5,716,277 A | * | 2/1998 | Reynolds ..................... | 464/131 |
| 5,769,723 A | * | 6/1998 | Faulbecker et al. ......... | 464/131 |
| 6,050,571 A | * | 4/2000 | Rieder et al. ................ | 277/353 |
| 6,077,166 A | * | 6/2000 | Reynolds ..................... | 464/133 |

FOREIGN PATENT DOCUMENTS

DE 196 22 444 C1 2/1998

* cited by examiner

Primary Examiner—Lynne H. Browne
Assistant Examiner—Kenn Thompson
(74) Attorney, Agent, or Firm—MacMillan, Sobanski & Todd, LLC

(57) ABSTRACT

A cross member unit for universal joints has a cross member (6) with four trunnions (17). Each two trunnions define a common longitudinal axis (7). Each trunnion (17) has an end face (18), a first sealing face (21) and a pre-sealing face (24). The pre-sealing face (24) is remote from the end face 18 and has a diameter increasing relative to the first sealing face (18). A bearing bush (9) is on each trunnion (17). Each bearing bush (9) has an open end 29 and has rolling contact members 27 rotatably supporting the trunnion (17) around the longitudinal axis (7) of the trunnion (17). An annular seal (30) is provided in each bearing bush 9. The annular seal (30) is held in the bearing bush 9 by a press fit. The annular seal (30) includes an annular carrier (31) which projects from the open end (29) of the bearing bush (9). The annular seal includes at least one first sealing lip (35) which is in contact with the first sealing face (18) of the trunnion (17). The annular seal has a pre-seal (38) in the form of a sealing lip or bead which is in contact with the pre-sealing face (24) of the trunnion 17. An end face (32) is on the carrier (31). The end face (32) is remote from the end face (18) of the trunnion (17). An annular gap (26) is formed between the end face (32) and a radial face (40) of a shoulder (39) of the trunnion (17).

16 Claims, 5 Drawing Sheets

CROSS MEMBER UNIT FOR UNIVERSAL JOINTS HAVING A TRUNNION SEAL

CROSS-REFERENCE TO RELATED APPLICATIONS

This application claims priority to German Patent Application Nos. 10140372.0 filed Aug. 23, 2001 and 10204684.0 filed Jun. 2, 2002, which applications are herein expressly incorporated by reference.

FIELD OF THE INVENTION

The invention relates to a cross member unit for universal joints having a cross member with four trunnions. Each two of the trunnions have a common longitudinal axis. A bearing bush, per trunnion, supports the trunnions via rolling members. A sealing assembly, per bearing bush, effectively seals between the bearing bush and the trunnion. The sealing assembly ensures that lubricating grease for the rolling members cannot leave the bearing bush.

BACKGROUND OF THE INVENTION

DE 196 22 444 C1 discloses a cross member unit. A main seal with a carrier is firmly positioned in an open end of the bearing bush. The carrier, to provide axial security, is formed into an annular groove which is arranged coaxially relative to a longitudinal axis of the trunnion. The main seal has two sealing lips which are formed onto the carrier. The lips are in sealing contact with sealing faces of the trunnion. The carrier projects axially from the open end of the bearing bush. A pre-seal is firmly slid onto a seat portion of the trunnion. The cross-section of the pre-seal has a U-shaped profile which embraces the projecting carrier of the main seal. A sealing lip is provided at one radially outer limb of the U-profile. The sealing lip is in sealing contact with a conical face of the bearing bush. A further sealing lip is in sealing contact with the metallic carrier of the main seal. The two sealing lips of the pre-seal ensure that even under the influence of a water jet of a high-pressure cleaning device, dirt cannot easily enter the region of the main seal. However, the pre-seal sealing lip which stops against the conically shaped sealing face of the bearing bush is directly subjected to external influences. In addition, it is necessary to provide two separate seals. Furthermore, the cross member unit according to DE 196 22 444 C1 has a stop disc between the main seal and the rolling members. The stop disc axially supports the rolling members.

SUMMARY OF THE INVENTION

It is an object of the present invention to provide a cross member unit for universal joints which includes a sealing assembly with a small number of parts. Also, the trunnion is stronger with respect to its diameter.

In accordance with the invention, a cross member unit for universal joints has a cross member with four trunnions. Each two trunnions define a common longitudinal axis. Each trunnion has an end face, a first sealing face and a pre-sealing face. The pre-sealing face is remote from the end face. The diameter of the pre-sealing face is increased relative to the first sealing face. A bearing bush is present per trunnion. The bearing bush has an open end and rotatably supports, via rolling members, the trunnion around the longitudinal axis of the trunnion. An annular seal is provided per bearing bush. The annular seal is held in the bearing bush by a press-fit. The annular seal includes an annular carrier which projects from the open end of the bearing bush. The annular seal includes at least one first sealing lip which is in contact with the first sealing face of the trunnion. The annular seal includes a pre-seal in the form of a sealing lip or bead which is in contact with the pre-sealing face of the trunnion. An end face of the carrier, remote from the end face of the trunnion, forms an annular gap together with a radial face of a shoulder of the trunnion. The cross member unit includes only one seal with at least one first sealing lip which acts as a main seal, and a pre-seal, in the form of a sealing lip or bead, which prevents dirt from penetrating into the region of the first sealing lip.

There is no need to provide a seat portion on the trunnion so that the pre-seal is in contact with a pre-sealing face of the trunnion. The diameter of the pre-sealing face of the trunnion can be greater than the diameter of a seat portion for a separate pre-seal. This means that the trunnion is reinforced in the critical region where the highest stresses occur. Since only one seal is provided, which is inserted into the open end of the bearing bush, the number of necessary assembly stages is reduced.

Furthermore, there is no need to provide a sealing face at the bearing bush. Thus, the bearing bush can be produced more easily and more cost-effectively. Further, it is not necessary to provide an inner circumferential groove in the bearing bush. The groove receives the carrier to axially secure the seal. The axial distance which the seal can be displaced inside the bearing bush, due to external forces, is delimited by the rolling members and by the radial face of the shoulder of the trunnion. In addition, the press fit ensures that, under normal loads, the seal is firmly positioned inside the bearing bush. The annular gap between the seal carrier and the radial face of the trunnion shoulder is dimensioned to compensate for any tolerances in the axial length of the seal and in the length of the rolling members. Therefore, in extreme case, the width of said annular gap can assume a zero value. The carrier can be metal or plastics, such as PA 6.6 for example.

Furthermore, the annular gap acts as a labyrinth seal. Thus, the pressure of a water jet of a high-pressure cleaning device is reduced when the water jet enters the annular gap. The pre-seal is protected by the carrier from direct external influences.

To increase the sealing effect, the seal may include a second sealing lip. The second sealing lip is in contact with a second sealing face of the trunnion. The second sealing lip is arranged in the direction of the longitudinal axis of the trunnion between the pre-seal and the first sealing lip. The first sealing lip and the first sealing face are designed so that the first sealing lip is pressed radially against the first sealing face. The second sealing lip and the second sealing face are designed so that the second sealing lip is axially pressed against the second sealing face.

In addition, it is possible to provide a third sealing lip. The third sealing lip is in contact with a third sealing face of the trunnion. The third sealing lip is arranged between the first sealing lip and the second sealing lip.

The carrier includes a radial annular portion to eliminate a stop disc between the seal and the rolling members. The radial annular portion remote from its end face includes a stop face for the rolling members which faces a way from the end face. The annular portion of the carrier thus takes on the function of a stop disc. The stop face includes a friction-reducing coating to reduce the friction between the radial annular portion of the carrier and the rolling members. Accordingly, since there is no need for a stop disc, the rolling members can be longer. Thus, the rolling members length prolongs the service life of the rolling member bearing.

The cross-section of the radial annular portion can be convex towards the rolling members. The rolling members, in the region of their axis of rotation, stop against the radial annular portion.

An outer seal is circumferentially secured to an outer face of the carrier portion to prevent any spray water from entering the region between the carrier of the seal and the bearing bush. The outer seal projects from the open end of the bearing bush. The outer seal is in sealing contact with an outer sealing face of the bearing bush. The outer seal effectively prevents spray water from entering the region between the carrier and the inner circumferential face of the bearing bush even when the universal joint is cleaned by a high-pressure cleaning device.

In a preferred embodiment, the outer sealing face includes a chamfer. The chamfer starts from an end face at the open end of the bearing bush and extends to an inner circumferential face of the bearing bush. The outer seal is in sealing contact with the chamfer.

The outer seal includes an outer sealing lip to increase the sealing effect of the outer seal. The sealing lip is in contact with the outer sealing face of the bearing bush. The outer sealing face may include an end face at the open end of the bearing bush. The outer seal is in sealing contact with the bearing bush.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
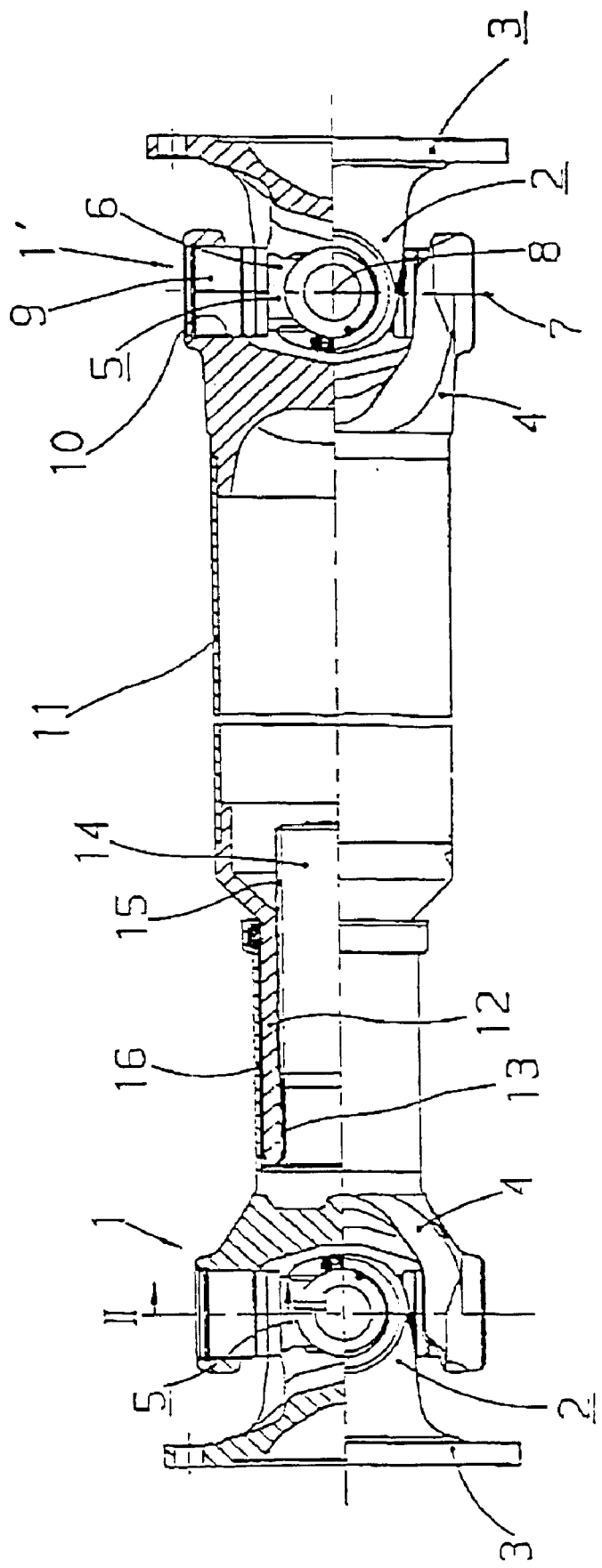
FIG. 1 is a side view partially in section of a shaft with universal joints.

FIG. 1 shows a cardan shaft with the two universal joints 1, 1'. Each of the two universal joints 1, 1' include a first joint yoke 2 which has a flange 3. A second joint yoke 4 is provided per universal joint 1, 1'. Both joint yokes 2, 4 are connected to one another by a cross member unit 5. The first joint yoke 2 carries out pivotal movements around the longitudinal axis 8. The assembly of the first joint yoke 2 and the cross member unit 5 is able to carry out pivotal movements around the second longitudinal axis 7 relative to the second joint yoke 4. The cross member unit 5 has a cross member 6 with four trunnions 17. Each trunnion includes a bearing assembly with a bearing bush 9 received in a yoke bore 10 of the respective joint yoke 2, 4.

A tube 11 is firmly connected to the second joint yoke 4 associated with the joint 1. The tube 11, in turn, carries the sliding sleeve 12. The sliding sleeve 12 has s a central bore with teeth 13 worked into the walls. The teeth 13 extend parallel to the longitudinal axis. A sliding journal 14 with outside teeth 15 is longitudinally adjustably received in said teeth 13. The sliding journal 14 is firmly connected to the second joint yoke of the universal joint 1'. The longitudinal displacement mechanism, which includes the sliding journal 14 and the sliding sleeve 12, accommodates longitudinal changes resulting from the change in position of the cardan shaft and thus from the articulation of the two universal joints 1, 1'. The longitudinal displacement mechanism, at one end, is covered by a protective pipe 16. The protective pipe 16 is secured to the second joint yoke 4 of the universal joint 1' and covers the outer face of the sliding sleeve 12. At their other end, the longitudinal displacement mechanism includes a seal with a sealing effect relative to the outer face. The two flanges 3 connect to a driving and driven part of the driveline into which the cardan shaft is inserted.

Figure 2:
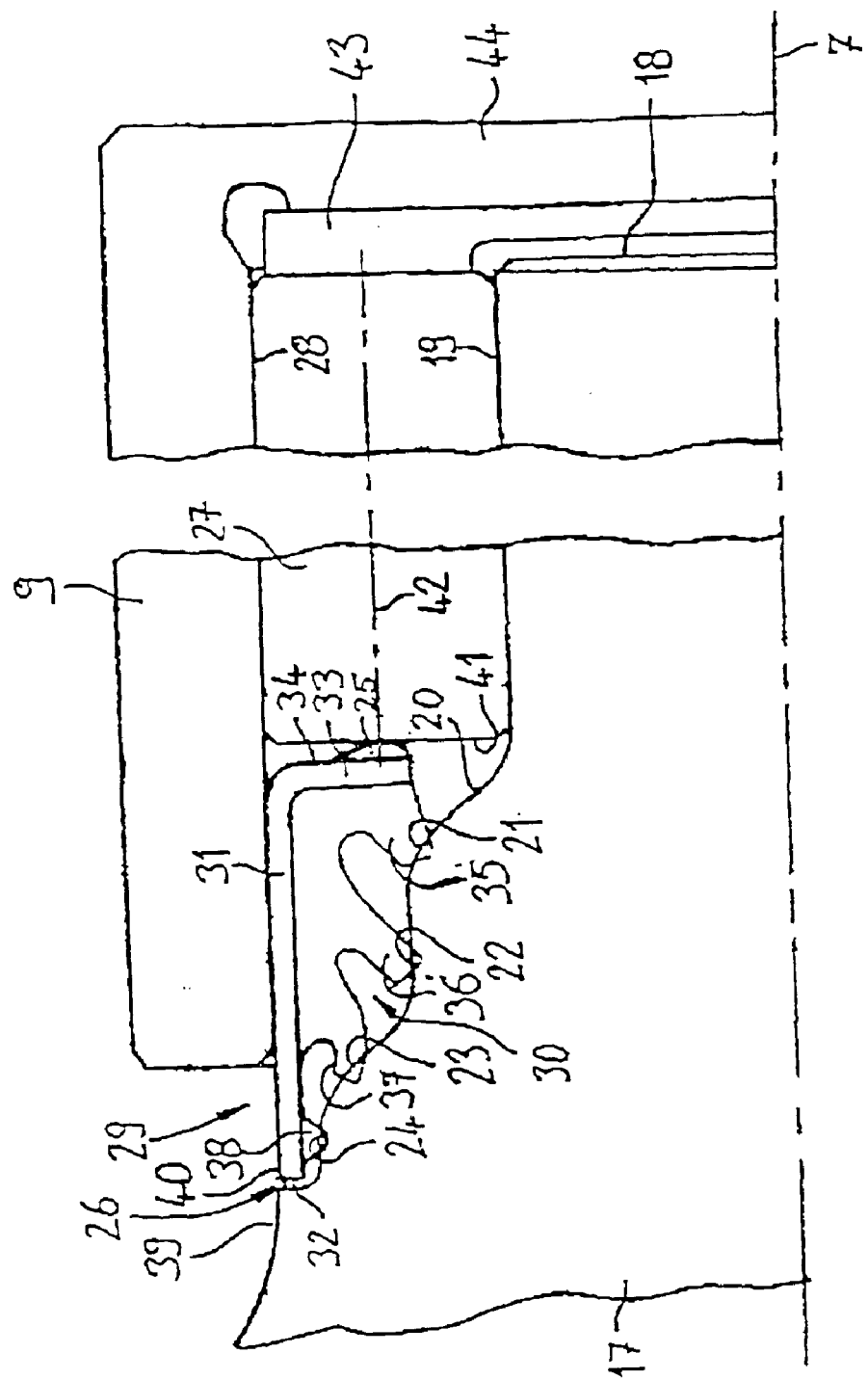
FIG. 2 is a section view of a detail of the cross member unit with a seal.

FIG. 2 illustrates a detail longitudinal section along the longitudinal axis of the cross member unit. FIG. 2 shows part of the cross member 6 with a trunnion 17. The trunnion 17 includes an end face 18 and a cylindrical running face 19 starting from the endface.

The cylindrical running face 19 is followed by a shoulder 20. The shoulder diameter increases from the cylindrical running face 19. The shoulder 20 is followed by a first sealing face 21, a second sealing face 23, a third sealing face 22 and a pre-sealing face 24. The first sealing face 21 and the third sealing face 22 have approximately identical diameters. The third sealing face 22 changes into the second sealing face 23. The second sealing face 23 is conical in shape. The pre-sealing face 24 has the greatest diameter relative to the remaining sealing faces 21, 22, 23.

The bearing bush 9 is supported on the trunnion 17 around the longitudinal axis 7 by rolling members 27. The rolling members 27 run on the running face 19 of the trunnion 17 and on the running face 28 of the bearing bush 9. The rolling members 27 are supported axially by a stop disc 43 against the base 44 of the bearing bush 9. The bearing bush 9 has an open end 29. A seal 30 is inserted and fixed, by a press fit, into a open end of the bearing bush 9.

The seal 30 includes a carrier 31 made of metal or plastics. The carrier 31 has a portion which projects from the open end 29 of the bearing bush 9. An end face 32 is at the terminal portion of the carrier 31. The carrier 31 includes an annular portion 33 which is axially remote from the end face 32. The annular portion extends radially towards the longitudinal axis 7 and provides a stop face 34 for the rolling members 27. The stop face 34 includes a friction-reducing coating 25 which preferably consists of polyamide.

The seal 30 includes a first sealing lip 35. The sealing lip 35 is radially supported against the first sealing face 21 of the trunnion 17. The seal 30 has a third sealing lip 36 radially supported against the third sealing face 22 of the trunnion 17. A second sealing lip 37 of the seal 30 is primarily axially supported against the second sealing face 23 of the trunnion 17. The seal 30 includes a pre-seal 38, in the form of a bead, in contact with the pre-sealing face 24 of the trunnion 17. The pre-seal 38 can also be in the form of a sealing lip.

The trunnion 17 includes a shoulder 39 which forms a radial face 40. The radial face 40 of the shoulder 39 and the end face 32 of the carrier 31, together, form an annular gap 26. The annular gap 26 serves as a labyrinth seal. Furthermore, the pre-seal 38 is protected behind the carrier 31. Direct external influencing factors are avoided because access to the pre-seal 38 is provided only in the form of a narrow annular gap 26. In addition, the carrier seal 31 is able to support itself axially of its end face 32 against the radial face 40 of the trunnion 17 when external forces act on the bearing bush 9.

Figure 3:
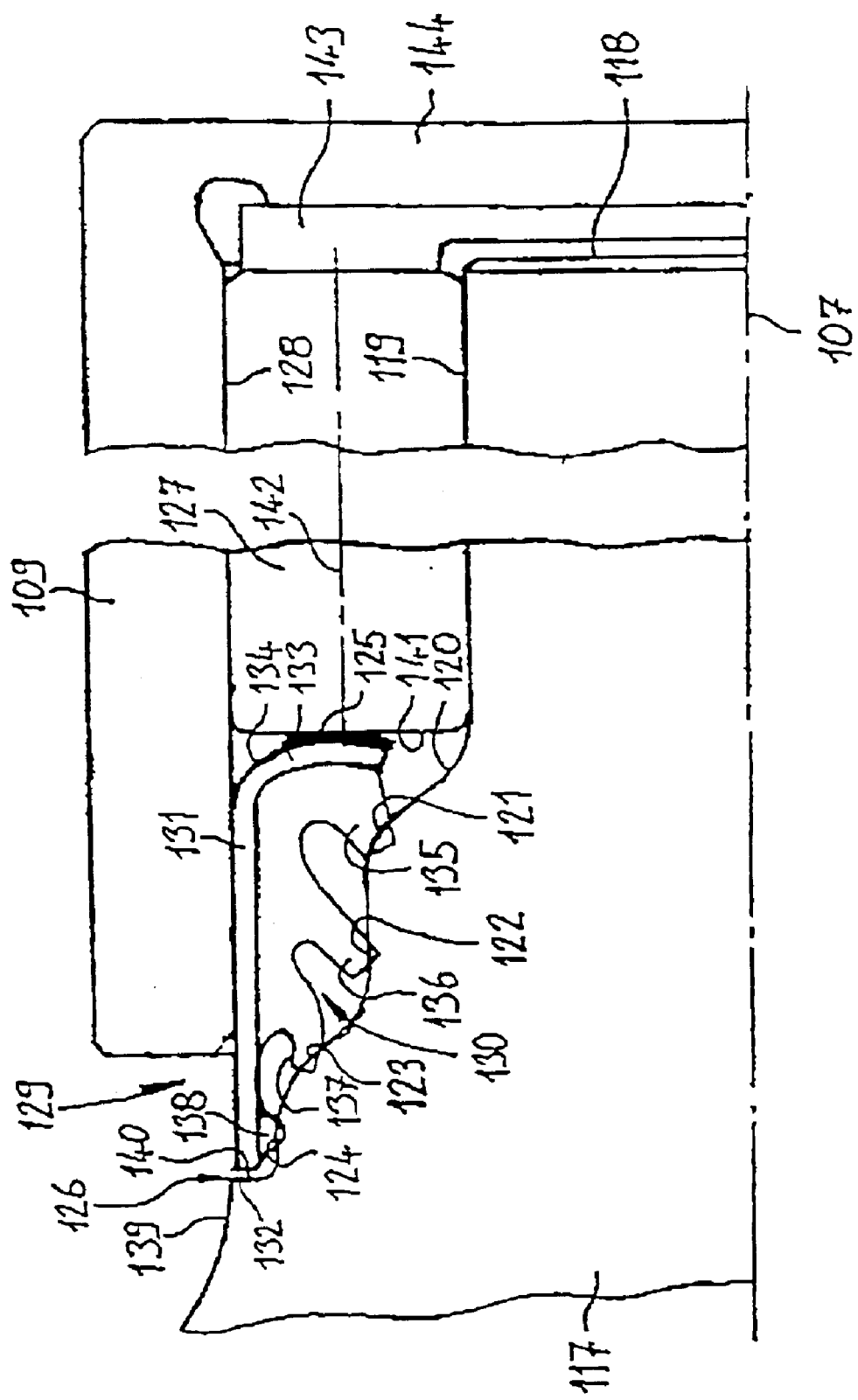
FIG. 3 is a section view of a detail of a cross member unit with an alternative seal design relative to the seal according to FIG. 2.

FIG. 3 shows a different design of a seal according to FIG. 2. The components which correspond to one another have been given reference numbers increased by the value 100 are were described in connection with FIGS. 1 and 2.

In the cross-section shown, the annular portion 133 is convex towards the rolling members 127. Thus, the rolling members only come into contact with the stop face 134, via the region of the end face 141 which faces the carrier 131 which is at the same distance from the longitudinal axis 107 as an axis of rotation 142 of the rolling member 127. Thus a line of contact is ensured between the rolling member 127 and the carrier 131. As a result, the friction losses are reduced between the rolling members 127 and the carrier 131.

Figure 4:
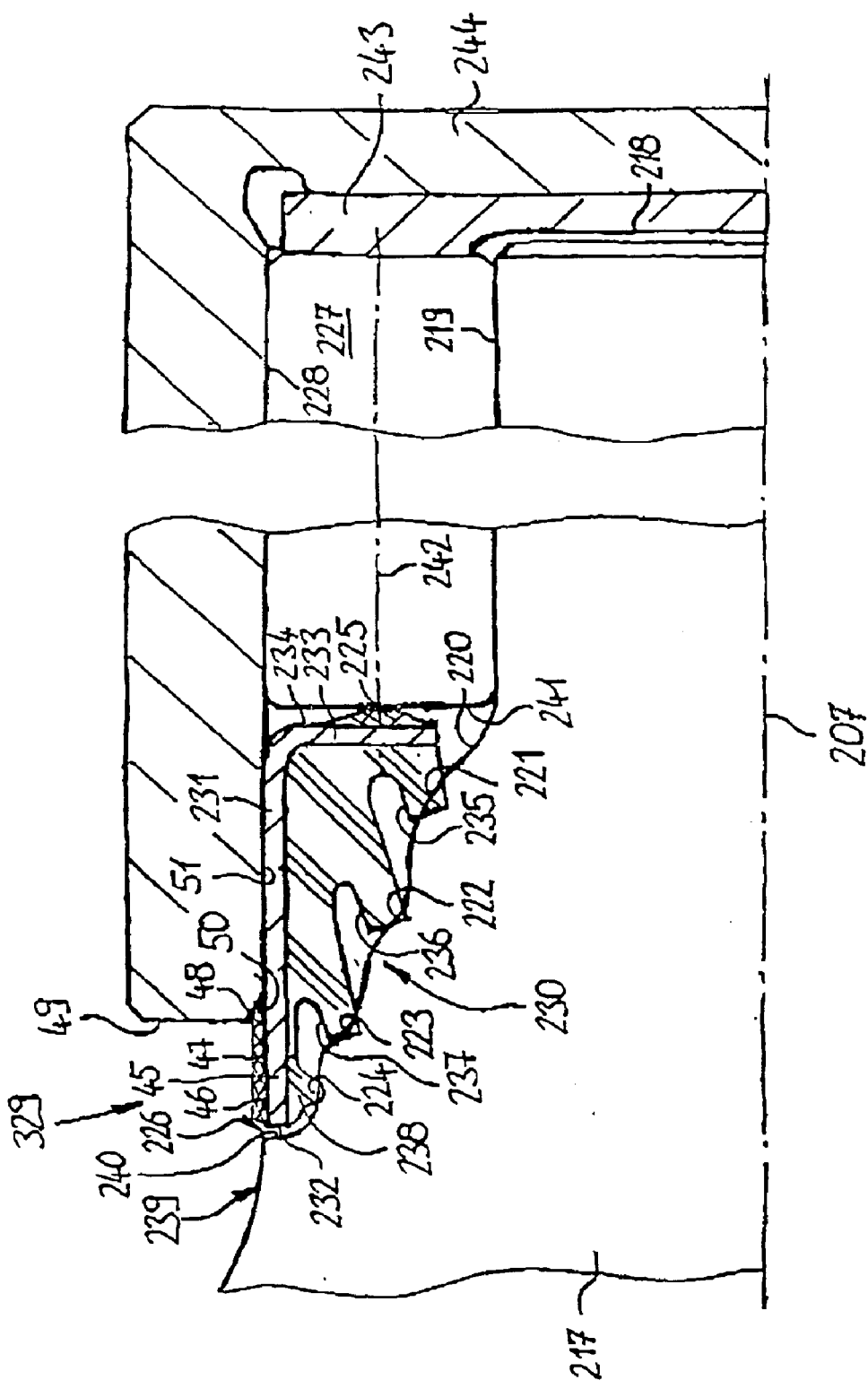
FIG. 4 is a section view of a detail of the cross member unit with a seal with an outer seal.

FIG. 4 shows a further embodiment of an inventive seal. Any components corresponding to those shown in FIG. 2 have been given reference number increased by the value 200 and are described in connection with FIG. 2.

A circumferential outer seal 47 is secured on an outer face 46 of the portion 45 of the carrier 231. Portion 45 projects from the open end 229 of the bearing bush 209. The outer seal 47 forms a sealing edge 48 which faces an end face 49 of the bearing bush 209. The end face 49 is formed at the open end 229 of the bearing bush 209. The bearing bush 209 includes a chamfer 50. The chamfer 50 starts at the end face 49 and changes into an inner circumferential face 51 of the bearing bush 209. The chamfer 50 serves as an outer sealing face and is sealingly contacted by the sealing edge 48.

Figure 5:
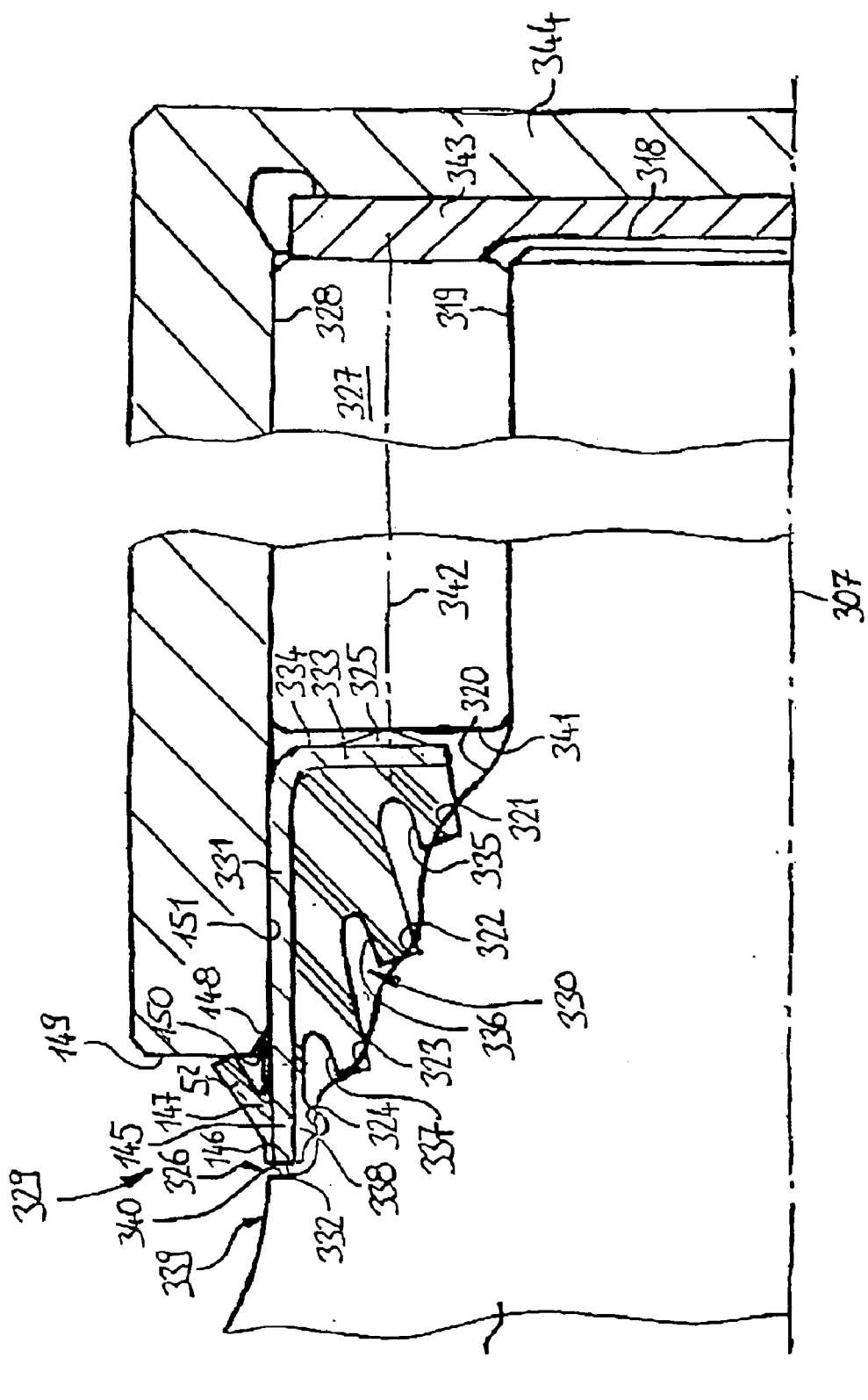
FIG. 5 is a section view of a detail of a cross member unit with an alternative seal design relative to the seal according to FIG. 4.

FIG. 5 shows an alternative design of a seal according to FIG. 4. Any components corresponding to those shown in FIG. 4 have been given reference numbers which are increased by the value 100. The elements are described in connection with FIGS. 1 and 2.

In contrast to the seal according to FIG. 4, the seal as shown in FIG. 5 includes an outer seal 147. The outer seal lip 147 includes an outer sealing lip 52 which is in sealing contact with the end face 149, which also serves as an outer sealing face of the bearing bush 309. In this way, the sealing edge 148 is protected against direct external influences. Thus, the sealing effect of the outer seal 147 is increased.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cross member unit for universal joints comprising:

a cross member with four trunnions, each two defining a common longitudinal axis, each trunnion including an end face, a first sealing face, a second sealing face, a third sealing face, and a pre-sealing face, said pre-sealing face being remote from the end face and having an increased diameter relative to the first sealing face;

a bearing bush on each trunnion, each bearing bush having an open end and rolling members rotatably supporting said trunnion around the longitudinal axis of the trunnion;

an annular seal per bearing bush, each annular seal being held in the bearing bush by a press-fit, each annular seal including an annular carrier which projects from the open end of the bearing bush, each annular seal having at least one first sealing lip which is in contact with the first sealing face of the trunnion, at least one second sealing lip which is in contact with the second sealing face of the trunnion, at least one third sealing lip which is in contact with the third sealing face of the trunnion, and a pre-seal in the form of a sealing lip or bead which is in contact with the pre-sealing face of the trunnion, wherein each second sealing lip is arranged in the direction of the longitudinal axis of the trunnion between the pre-seal and the first sealing lip, each third sealing lip is arranged between said first sealing lip and said second sealing lip, each first sealing lip and first sealing face being designed such that the first sealing lip is radially pressed against the first sealing face, and each second sealing lip and second sealing face being designed such that the second sealing lip is axially pressed against the second sealing face; and wherein an end face of each carrier remote from the end face of the trunnion, forms an annular gap together with a radial face of a shoulder of the trunnion.

2. A cross member unit according to claim 1, wherein the carrier includes a radial annular portion which is remote from its end face and which includes a stop face for the rolling members, which stop face faces away from the end face.

3. A cross member unit according to claim 2, wherein said stop face includes a friction-reducing coating.

4. A cross member unit according to claim 1, wherein on one outer face of the portion of the carrier which projects from the open end of the bearing bush, an outer seal is circumferentially secured, said outer seal being in sealing contact with an outer sealing face of the bearing bush.

5. A cross member unit according to claim 4, wherein the outer sealing face includes a chamfer which starts from an end face arranged at the open end of the bearing bush and extends to an inner circumferential face of the bearing bush and being in sealing contact with the outer seal.

6. A cross member unit according to claim 4, wherein the outer seal includes an outer sealing lip which is in sealing contact with the outer sealing face of the bearing bush.

7. A cross member unit according to claim 6, wherein the outer sealing face includes an end face which is arranged at the open end of the bearing bush and being in sealing contact with the outer seal.

8. A cross member unit for universal joints comprising:

a cross member with four trunnions each two defining a common longitudinal axis, each trunnion including an end face, a first sealing face and a pre-sealing face, said pre-sealing face remote from the end face and having an increased diameter relative to the first sealing face;

a bearing bush on each trunnion, said bearing bush having an open end and rolling members rotatably supporting said trunnion around the longitudinal axis of the trunnion;

an annular seal per bearing bush, said annular seal being held in the bearing bush by a press-fit, said annular seal including an annular carder which projects from the open end of the bearing bush, said annular seal having at least one first sealing lip which is in contact with the first sealing face of the trunnion, said annular seal having a pre-seal in the form of a sealing lip or bead which is in contact with the pre-sealing face of the trunnion;

wherein an end face of the carder remote from the end face of the trunnion, forms an annular gap together with a radial face of a shoulder of the trunnion, said annular gap serving as a labyrinth seal that functions as the sole seal to protect said pre-seal.

9. A cross member unit according to claim 8, wherein the seal includes a second sealing lip in contact with a second sealing face of the trunnion and said second sealing lip arranged in the direction of the longitudinal axis of the trunnion between the pre-seal and the first sealing lip, said the first sealing lip and the first sealing face being designed such that the first sealing lip is radially pressed against the first sealing face, and said second sealing lip and the second sealing face being designed such that the second sealing lip is axially pressed against the second sealing face.

10. A cross member unit according to claim 9, wherein a third sealing lip being in contact with a third sealing face of the trunnion and said third sealing lip arranged between the first sealing lip and the second sealing lip.

11. A cross member unit according to claim 8, wherein the carrier includes a radial annular portion which is remote from its end face and which includes a stop face for the rolling members, which stop face faces away from the end face.

12. A cross member unit according to claim 11, wherein said stop face includes a friction-reducing coating.

13. A cross member unit according to claim 8, wherein on one outer face of the portion of the carrier which projects from the open end of the bearing bush, an outer seal is circumferentially secured, said outer seal being in sealing contact with an outer sealing face of the bearing bush.

14. A cross member unit according to claim 13, wherein the outer sealing face includes a chamfer which starts from an end face arranged at the open end of the bearing bush and extends to an inner circumferential face of the bearing bush and being in sealing contact with the outer seal.

15. A cross member unit according to claim 13, wherein the outer seal includes an outer sealing lip which is in sealing contact with the outer sealing face of the bearing bush.

16. A cross member unit according to claim 15, wherein the outer sealing face includes an end face which is arranged at the open end of the bearing bush and being in sealing contact with the outer seal.

* * * * *

UNITED STATES PATENT AND TRADEMARK OFFICE
CERTIFICATE OF CORRECTION

PATENT NO. : 6,736,731 B2  
DATED : May 18, 2004  
INVENTOR(S) : Hans-Jurgen Schultze et al.

It is certified that error appears in the above-identified patent and that said Letters Patent is hereby corrected as shown below:

<u>Column 6,</u>  
Line 66, replace the word "carder" with the word -- carrier --

<u>Column 7,</u>  
Line 6, replace the word "carder" with the word -- carrier --

Signed and Sealed this

Tenth Day of August, 2004

JON W. DUDAS  
*Acting Director of the United States Patent and Trademark Office*